(12) United States Patent
Gouda et al.

(10) Patent No.: US 7,793,344 B2
(45) Date of Patent: Sep. 7, 2010

(54) METHOD AND APPARATUS FOR IDENTIFYING REDUNDANT RULES IN PACKET CLASSIFIERS

(75) Inventors: Mohamed G. Gouda, Austin, TX (US); Xiang-Yang Alex Liu, Austin, TX (US)

(73) Assignee: The Board of Regents, University of Texas System, Austin, TX (US)

( * ) Notice: Subject to any disclaimer, the term of this patent is extended or adjusted under 35 U.S.C. 154(b) by 1023 days.

(21) Appl. No.: 11/444,022

(22) Filed: May 31, 2006

(65) Prior Publication Data
US 2006/0277601 A1    Dec. 7, 2006

Related U.S. Application Data

(60) Provisional application No. 60/686,504, filed on Jun. 1, 2005.

(51) Int. Cl.
*G06F 15/16* (2006.01)
(52) U.S. Cl. .............. 726/11; 726/12; 726/13; 726/14; 726/22; 726/23; 726/24; 726/25; 709/225; 709/226; 709/227; 709/228; 709/229; 713/155; 713/167

(58) Field of Classification Search .............. 726/2–3, 726/17, 27, 11–14; 713/153–154, 155, 167; 709/225–229
See application file for complete search history.

(56) References Cited

U.S. PATENT DOCUMENTS

| | | | | |
|---|---|---|---|---|
| 6,807,576 | B1* | 10/2004 | Jeffries et al. | 709/225 |
| 7,185,192 | B1* | 2/2007 | Kahn | 713/155 |
| 7,337,230 | B2* | 2/2008 | Zehavi | 709/229 |
| 2003/0212900 | A1* | 11/2003 | Liu et al. | 713/200 |

* cited by examiner

*Primary Examiner*—Taghi T Arani
*Assistant Examiner*—Josnel Jeudy
(74) *Attorney, Agent, or Firm*—Antony P. Ng; Dillon & Yudell LLP (57) ABSTRACT

A system, method, and computer-usable medium for removing redundancy from packet classifiers. In a preferred embodiment of the present invention, a packet classifier is implemented as a sequence of rules. A redundancy manager marks at least one upward redundant rule and at least one downward redundant rule. The redundancy manager removes at least one rule marked as upward redundant and at least one rule marked as downward redundant.

9 Claims, 7 Drawing Sheets

FIG. 1A

FIG. 1B $r_1 : F_1 \in [1,50] \longrightarrow$ ACCEPT $r_2 : F_1 \in [40,90] \longrightarrow$ DISCARD $r_3 : F_1 \in [30,60] \longrightarrow$ ACCEPT $r_4 : F_1 \in [51,100] \longrightarrow$ DISCARD

$r_1 : (F_1 \in [20,50]) \wedge (F_2 \in [35,65]) \longrightarrow a$ $r_2 : (F_1 \in [10,60]) \wedge (F_2 \in [15,45]) \longrightarrow d$ $r_3 : (F_1 \in [30,40]) \wedge (F_2 \in [25,55]) \longrightarrow a$

$r_4 : (F_1 \in [1,100]) \wedge (F_2 \in [1,100]) \longrightarrow d$

FIG. 3

$E_1 = \{F_1 \in [20,50]) \wedge F_2 \in [35,65] \longrightarrow a\}$

FIG. 4

$E_2 = \{F_1 \in [10,19] \cup [51,60] \wedge F_2 \in [15,45] \longrightarrow d$
$\quad\quad F_1 \in [20,50] \wedge F_2 \in [15,34] \longrightarrow d\}$

FIG. 5

1: $E_1 = \{F_1 \in [20,50] \wedge F_2 \in [35,65] \longrightarrow a\}$;

2: $E_2 = \{F_1 \in [10,19] \cup [51,60] \wedge F_2 \in [15,45] \longrightarrow d$
$\quad\quad F_1 \in [20,50] \wedge F_2 \in [15,34] \longrightarrow d\}$;

3: $E_3 = \emptyset$

4: $E_4 = \{$
$\quad F_1 \in [1,9] \cup [61,100] \wedge F_2 \in [1,100] \longrightarrow d$
$\quad F_1 \in [20,29] \cup [41,50] \wedge F_2 \in [1,14] \cup [66,100] \longrightarrow d$
$\quad F_1 \in [30,40] \wedge F_2 \in [1,14] \cup [66,100] \longrightarrow d$
$\quad F_1 \in [10,19] \cup [51,60] \wedge F_2 \in [1,14] \cup [16,100] \longrightarrow d\}$

METHOD AND APPARATUS FOR IDENTIFYING REDUNDANT RULES IN PACKET CLASSIFIERS

PRIORITY CLAIM

The application claims the benefit of priority under 35 U.S.C. §119(e) from U.S. Provisional Application No. 60/686,504, filed on Jun. 1, 2005, which disclosure is incorporated herein by reference.

BACKGROUND OF THE INVENTION

1. Technical Field

The present invention relates in general to the field of data processing systems. More particularly, the present invention relates to communication between data processing systems. Still more particularly, the present invention relates to a system and method of optimizing communication between data processing systems.

2. Description of the Related Art

In the past, so-called "hackers" have accessed and compromised private networks through direct dialing of modems coupled to the private network. With the advent of the Internet, individuals, business, and government have discovered that communication between networks could be established via the Internet instead of relying on connections between private networks. However, connecting a private network to the Internet introduces significant security problems for the data stored on a private network.

When a private network is coupled to the Internet, hackers may utilize the Internet as a means of accessing the private network. Therefore, many businesses, individuals, and the government utilize protective software and/or hardware known as a "firewall" to protect the private network from unauthorized access. A firewall is typically a hardware and/or software module that provides secure access to and from the private network by examining any packet of data that attempts to enter or leave the private network at some entry point. Depending on the configuration of an individual packet, the firewall determines whether the packet should proceed on its way or be discarded. To perform this function, the firewall includes a sequence of rules, which are in the form <predicate>→<decision>, where <predicate> is a Boolean expression over the different fields of a packet, and the <decision> of this rule is an operation applied to the packet.

Most routers implemented on the Internet have packet classification capabilities. "Packet classification" is a function that enables routers to perform many services, such as routing, active networking, firewall access control, quality of service, differential service, and other network services. A packet classifier maps each packet to a decision based on a sequence of rules. A packet can be viewed as a tuple with a finite number of fields. Examples of such fields are source/destination IP address, source/destination port number, and protocol type. A packet classifier can map a packet to a variety of application-specific decisions. For example, possible decisions include "accept" or "discard", as utilized in the context of a firewall.

Each packet classifier also includes a sequence of rules. Each rule in a packet classifier is implemented as <predicate>→<decision>, which are in the form <predicate>→<decision>, where <predicate> is a Boolean expression over the different fields of a packet, and the <decision> of this rule is an operation applied to the packet. A packet "matches" a rule if and only if the packet satisfies the predicate of the rule. A packet may match more than one rule in a packet classifier. Therefore, a packet classifier maps each packet to the decision of the first (i.e., highest priority) rule that the packet matches.

A packet classifier may have redundant rules. A rule in a packet classifier is redundant if and only if removing the rule does not change the decision of the packet classifier for each packet. The presence of redundant rules increases the processing time required for packet routing and decreases system performance. Therefore, there is a need for a system and method for addressing the aforementioned limitations of the prior art.

SUMMARY OF THE INVENTION

The present invention includes a system, method, and computer-usable medium for removing redundant rules from packet classifiers. In a preferred embodiment of the present invention, a packet classifier is implemented as a sequence of rules. A redundancy manager marks at least one upward redundant rule and at least one downward redundant rule. The redundancy manager removes at least one rule marked as upward redundant and at least one rule marked as downward redundant.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1A:
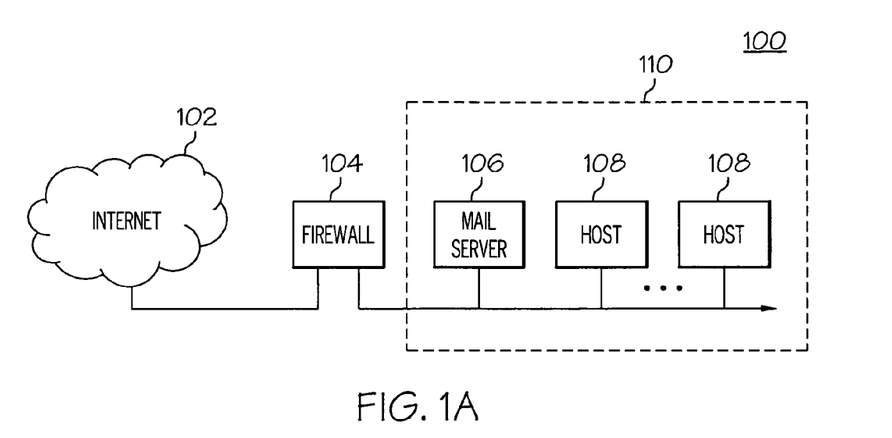
FIG. 1A is a block diagram illustrating an exemplary network in which a preferred embodiment of the present invention may be implemented.

Referring now to the figures, and in particular, referring to FIG. 1A, there is illustrated an exemplary network 100 in which a preferred embodiment of the present invention may be implemented. As illustrated, network 100 includes Internet 102, which is coupled to private network 110 via firewall 104.

Internet 102 is an interconnected system of networks that connects computers around the world via the transmission control protocol/internet protocol (TCP/IP) protocol suite. Firewall 104 provides secure access to and from private network 110. Particularly, any packet that attempts to enter or leave private network 110 is first examined by firewall 104 and, depending on the settings of the different fields in the packet, firewall 104 determines whether to transmit or discard the packet.

As previously discussed, firewall 104 includes a sequence of rules, each in the form of <predicate>→<decision>, where <predicate> is a Boolean expression over the different fields on the packet and <decision> is either "a" (for "accept") or "d" (for discard). To reach a decision concerning a packet, each of the rules in the sequence are examined until the first rule with a <predicate> that satisfies the packet fields is found. The <decision> is then applied to the packet.

In the depicted embodiment, private network 110 includes a mail server 106 and at least one host 108. If firewall 104 decides to accept an incoming packet, the packet is routed by firewall 104 or an associated router to either mail server 106 or host(s) 108 depending on the setting of the fields in the packet.

Figure 1B:
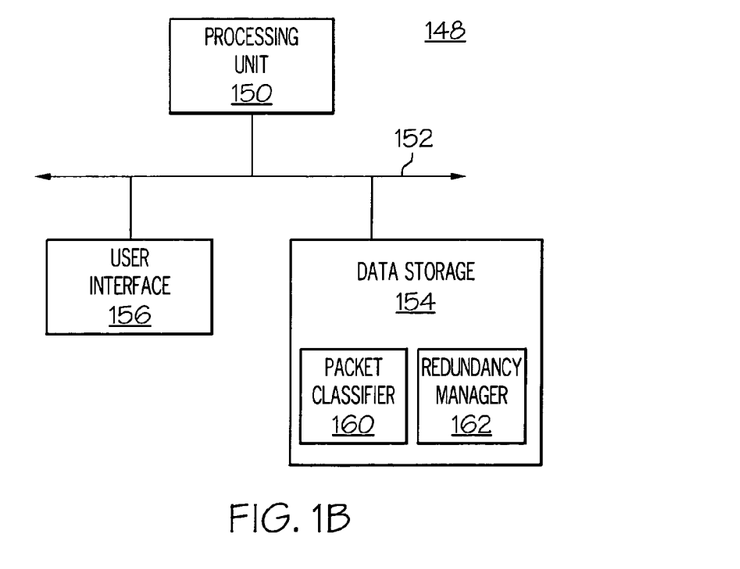
FIG. 1B is a block diagram depicting an exemplary data processing system in which a preferred embodiment of the present invention may be implemented.

FIG. 1B is a block diagram depicting an exemplary data processing system 148 in which a preferred embodiment of the present invention may be implemented. Those with skill in the art will appreciate that firewall 104, mail server 106, or host(s) 108 may be implemented with a data processing system 148. Also, those with skill in the art will appreciate that the present invention is not limited to the representation of data processing system 148 illustrated in FIG. 1B, but may include any type of single or multi-processor data processing system.

As illustrated, data processing system 148 includes processing unit 150, data storage 154, and user interface 156 which are all coupled by interconnect 152. Data storage 154 may be implemented by any type of volatile or non-volatile memory such as read-only memory (ROM), random-access memory (RAM), any type of flash memory, optical memory, and magnetic storage. Also, as depicted, data storage 154 includes program code forming a packet classifier 160 for routing packets depending on a collection of rules and a redundancy manager 162 for removing redundant rules from packet classifier 160. Both packet classifier 160 and redundancy manager 162 are discussed herein in more detail.

Figure 1C:
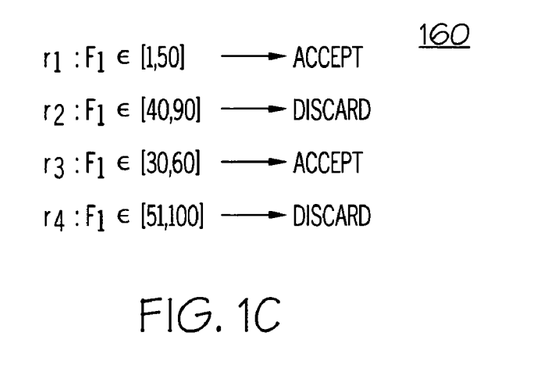
FIG. 1C illustrates an exemplary packet classifier according to a preferred embodiment of the present invention.

Referring now to FIG. 1C, there is illustrated an exemplary packet classifier 160 according to a preferred embodiment of the present invention. As illustrated, packet classifier 160 includes a collection of rules $r_1$ through $r_4$, where each rule dictates a certain action ("accept" or "discard") depending on the value of the packet within a "packet field domain". In a preferred embodiment of the present invention, the packet field domain is defined over an interval of 1 to 100, but those with skill in the art will appreciate that the packet field domain can be a domain of any size.

A "packet" over the fields $F_1 \ldots, F_d$ is defined as a d-tuple $(p_1 \ldots, p_d)$ where each $p_i$ is in the domain $D(F_i)$ of field $F_i$, and each $D(F_i)$ is an interval of nonnegative integers. For example, the domain of the source address in an IP packet is $[0, 2^{32}-1]$. We use $\Sigma$ to denote the set of all packets over fields $F_1, F_2 \ldots, F_d$. It follows that $\Sigma$ is a finite set and $|\Sigma|=|D(F_1)| \times \ldots \times |D(F_n)|$.

A "packet classifier" (e.g., packet classifier 160), over the fields $F_1 \ldots, F_d$ and whose decision set is DS, is a sequence of rules, and each rule is of the following format:

$(F_1 \in S_1) \wedge (F_2 \in S_2) \wedge \ldots \wedge (F_d \in S_d) \rightarrow <\text{decision}>$ where each $S_i$ is a nonempty subset of $D(F_i)$ and <decision> is an element of DS. A packet $(p_1 \ldots, p_d)$ matches a rule $(F_1 \in S_1) \wedge (F_2 \in S_2) \wedge \ldots \wedge (F_d \in S_d) \rightarrow <\text{decision}>$ if and only if the following condition holds: $(p_1 \in S_1) \wedge (p_2 \in S_2) \wedge \ldots \wedge (p_d \in S_d)$. Unless otherwise specified, all packets and all packet classifiers are hereinafter implemented over the fields $F_1, F_2 \ldots, F_d$.

Consider a packet classifier f that consists of n rules $<r_1, r_2, \ldots, r_n>$. The "matching set" of a rule $r_i$ in this packet classifier is the set of all packets that match $r_i$. The "resolving set" of a rule $r_i$ in this packet classifier is the set of all packets that match $r_i$, but do not match any $r_j$ that $j<i$. For example, consider the rule $r_2$ in FIG. 1C=its matching set is the set of all the packets whose $F_1$ field is in [40, 90] and its resolving set is the set of all the packets whose $F_1$ field is in [51, 90]. The matching set of a rule $r_i$ is denoted $M(r_i)$, and the resolving set of a rule $r_i$ in packet classifier f is denoted $R(r_i, f)$. Note that the matching set of a rule depends only on the rule itself, while the resolving set of a rule depends both the rule itself and all the rules listed above it in a packet classifier.

From the definition of $M(r_i)$ and $R(r_i, f)$, $M(r_i)$ and $R(r_i, f)$ have the following relation:

$$R(r_i, f) = M(r_i) - \bigcup_{j=1}^{i-1} M(r_j)$$

Theorem 1: Let f be any packet classifier that consists of n rules: $<r_1, r_2 \ldots, r_n>$ For each i, $1 \leq i \leq n$:

$$R(r_i, f) = M(r_i) - \bigcup_{j=1}^{i-1} R(r_j, f)$$

A sequence of rules $<r_1, r_2 \ldots, r_n>$ is comprehensive if and only if for any packet p, there is at least one rule that matches p in the sequence. A sequence of rules must be comprehensive for it to serve as a packet classifier. From now on, we assume each packet classifier is comprehensive. Therefore, we have the following theorem:

Theorem 2: Let f be any packet classifier that consists of n rules: $<r_1, r_2 \ldots, r_n>$. The following two conditions hold:
1. Determinism: $R(r_i, f) \cap R(r_j, f) = \emptyset$ ($i \neq j$)
2. Comprehensiveness:

$$\bigcup_{i=1}^{n} R(r_i, f) = \Sigma$$

f(p) denotes the decision to which a packet classifier f maps a packet p. Two packet classifiers f and f' are equivalent, denoted f≡f', if and only if for any packet p in $\Sigma$, f(p)=f'(p) holds. This equivalence relation is symmetric, self-reflective, and transitive.

The following theorem indicates that the last rule in a packet classifier can be modified in a way that the resulting packet classifier is equivalent to the original packet classifier.

Theorem 3: Let f be any packet classifier that consists of n rules: $<r_1, r_2 \ldots, r_n>$. If rule $r_n$ in f is of the form: $(F_1 \in S_1) \wedge (F_2 \in S_2) \wedge \ldots \wedge (F_d \in S_d) \rightarrow <\text{decision}>$, and if f' is the resulting packet classifier after rule $r_n$ is modified to become of the form: $(F_1 \in D(F_1)) \wedge (F_2 \in D(F_2)) \wedge \ldots \wedge (F_d \in D(F_d)) \rightarrow <\text{decision}>$ then f and f' are equivalent.

Proof Sketch:
According to Theorem 1, $$R(r_n, f) = M(r_n) - \bigcup_{j=1}^{n-1} R(r_j, f)$$

and according to Theorem 2, $$R(r_n, f) = \Sigma - \bigcup_{j=1}^{n-1} R(r_j, f)$$

does not change if we modify $M(r_n)$ to be $\Sigma$, i.e., if we modify the predicate of the last rule $r_n$ to be $(F_1 \in D(F_1)) \wedge (F_2 \in D(F_2)) \wedge \ldots \wedge (F_d \in D(F_d))$.

By modifying rule $r_n$, in this way, any postfix of a packet classifier is comprehensive, i.e., if $\langle r_1, r_2 \ldots, r_n \rangle$ is comprehensive, then $\langle r_i, r_{i+1} \ldots, r_n \rangle$ is comprehensive for each i, $1 \leq i \leq n$. The predicate of the last rule in a packet classifier is hereinafter assumed to be $(F_1 \in D(F_1)) \wedge (F_2 \in D(F_2)) \wedge \ldots \wedge (F_d \in D(F_d))$.

Redundant rules are defined as follows:

Definition 1: A rule r is redundant in a packet classifier f if and only if the resulting packet classifier f' after removing rule r is equivalent to f.

The following theorem shows a necessary and sufficient condition for identifying redundant rules. Note that the notation $\langle r_{i+1}, r_{i+2} \ldots, r_n \rangle(p)$ is utilized to denote the decision to which the packet classifier $\langle r_{i+1}, r_{i+2} \ldots, r_n \rangle$ maps the packet p.

Theorem 4 (Redundancy Theorem): Let f be any packet classifier that consists of n rules: $\langle r_1, r_2 \ldots, r_n \rangle$.

A rule $r_i$ is redundant in f if and only if one of the following two conditions holds:
1. $R(r_i, f) = \emptyset$
2. $R(r_i, f) \neq \emptyset$ and for any p that $p \in R(r_i, f)$, $\langle r_{i+1}, r_{i+2} \ldots, r_n \rangle(p)$ is the same as the decision of $r_i$.

Utilizing the redundancy theorem, all redundant rules are categorized as either upward or downward redundant rules.

Definition 2: A rule that satisfies the first condition in the redundancy theorem is called an upward redundant rule, whereas a rule that satisfies the second condition in the redundancy theorem is called a redundant rule.

Consider the example packet classifier f in FIG. 1C. Rule $r_3$ is an upward redundant rule because $R(r_3, f) = \emptyset$. Let f' be the resulting packet classifier by removing rule $r_3$ from f. Then rule $r_3$ is downward redundant in f'.

Let f be any packet classifier that consists of n rules: $\langle r_1, r_2 \ldots, r_n \rangle$ 1. Upward Redundancy vs. Backward Redundancy:

A rule $r_i$ is backward redundant in f if and only if there exists k, $1 \leq k < i$, such that $M(r_i) \subseteq M(r_k)$. Clearly, if there exists such k for $r_i$, then $$R(r_i, f) = M(r_i) - \bigcup_{j=1}^{i-1} M(r_j) = \emptyset;$$

therefore, $r_i$ is upward redundant. However, if $R(r_i, f) = \emptyset$, such k may not exist. As an example, in the packet classifier in FIG. 1C, rule $r_3$ is upward redundant, but not backward redundant.

2. Downward Redundancy vs. Forward Redundancy:

A rule $r_i$ is forward redundant if and only if there exists k, $i < k \leq n$, such that the following three conditions hold: (1) $M(r_i) \subseteq M(r_k)$, (2) $r_i$ and $r_k$ have the same decision, (3) for any j that $i < j < k$, either $M(r_i) \cap M(r_j) = \emptyset$ or $r_i$ and $r_j$ have the same decision. Clearly, if there exists such k for $r_i$, then for any p that $p \in R(r_i, f)$, the decision $\langle r_{i+1}, r_{i+2} \ldots, r_n \rangle(p)$ is the same as the decision of $r_i$; therefore, $r_i$ is downward redundant. However, a rule may be downward redundant even if there is no such k. As an example, in the packet classifier that results from the classifier in FIG. 1 after $r_3$ is removed, rule $r_2$ is downward redundant, but not forward redundant. Thus, $r_2$ can be removed according to a preferred embodiment of the present invention.

Figure 2:
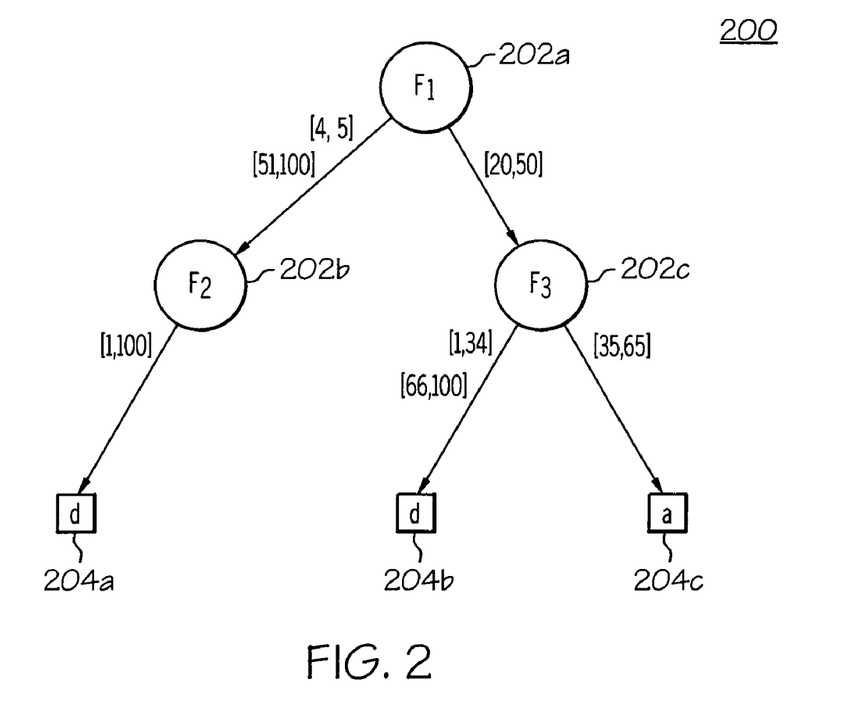
FIG. 2 depicts an exemplary packet decision diagram according to a preferred embodiment of the present invention.

FIG. 2 illustrates an exemplary packet decision diagram 200 according to a preferred embodiment of the present invention. As depicted, packet decision diagram 200 includes non-terminal nodes 202a-c and terminal (e.g., decision) nodes 204a-c. The outgoing edges of non-terminal nodes 202a-c are labeled with intervals that enable packets including those values to be directed along packet decision diagram 200 to conclusions in non-terminal nodes 202a-c.

Packet Decision Diagram (PDD) f 200 with a decision set DS and over fields $F_1 \ldots, F_d$ is an acyclic and directed graph that has the following five properties:

1. There is exactly one node in f that has no incoming edges and is called the root of f. The nodes in f that have no outgoing edges are called terminal nodes of f.
2. Each node v in f has a label, denoted F(v), such that $F(v) \in \{F_1 \ldots, F_d\}$ if v is a nonterminal node; and $F(v) \in DS$ if v is a terminal node.
3. Each edge e in f has a label, denoted I(e), such that if e is an outgoing edge of node v, then I(e) is a nonempty subset of D(F(v)).
4. A directed path in f from the root to a terminal node is called a decision path of f. No two nodes on a decision path have the same label.
5. The set of all outgoing edges of a node v in f, denoted E(v), satisfies the following two conditions:
    (a) Consistency: $I(e) \cap I(e') = \emptyset$ for any two distinct edges e and e' in E(v),
    (b) Completeness: $\bigcup_{e \in E(v)} I(e) = D(F(v))$ FIG. 2 depicts an example of a PDD 200 with a decision set $\{a, d\}$ and over the two fields $F_1$ and $F_2$, where $D(F_1) = D(F_2) = [1, 100]$. Hereinafter, the decision set $\{a, d\}$ is utilized, where "a" represents "accept" and "d" represents "discard".

A decision path in a PDD f 200 is represented by $(v_i e_1 \ldots v_k e_k v_{k+1})$ where $v_1$ is the root of f, $v_{k+1}$ is a terminal node of f, and each $e_i$ is a directed edge from node $v_i$ to node $v_{i+1}$ in f. A decision path $(v_i e_1 \ldots v_k e_k v_{k+1})$ in a PDD defines the following rule:

$$F_1 \in S_1 \wedge \ldots \wedge F_n \in S_n \to F(v_{k+1})$$

where $S_i = I(e_j)$, if there is a node $v_j$ in the decision path that is labeled with field $F_i$; and $S_i = D(F_i)$, if no nodes in the decision path is labeled with $F_i$.

For a PDD f, $S_f$ is utilized to represent the set of all the rules defined by all the decision paths of f. For any packet p, there is one and only one rule in $S_f$ that p matches because of the consistency and completeness properties of the PDD f; therefore, f maps p to the decision of the only rule that p matches in $S_f$. We use f(p) to denote the decision to which a PDD f maps a packet p. PDD f and a sequence of rules f' are equivalent, denoted $f \equiv f'$, if and only if for any packet p, the condition $f(p) = f'(p)$ holds.

Given a PDD f, any packet classifier that consists of all the rules in $S_f$ is equivalent to f. The order of the rules in such a packet classifier is immaterial because there are no overlapping rules in $S_f$.

An equivalent PDD is constructed after all the upward redundant rules are removed by the upward redundancy removal algorithm after given a sequence of rules, as discussed in more detail herein.

In the process of detecting and removing downward redundant rules, the data structure utilized is referenced herein as a standard PDD. A standard PDD is a special type of PDD where the following two additional conditions hold:

1. Each node has at most one incoming edge (i.e., a standard PDD is of a tree structure); and
2. Each decision path contains d nonterminal nodes, and the i-th node is labeled $F_1$ for each i that $1 \leq i \leq d$ (i.e., each decision path in a standard PDD is of the form $(v_1 e_1 v_2 e_2 \ldots v_d e_d v_{d+1})$ where $F(v_i)=F_i$ for each i that $1 \leq i \leq d$).

In the process of checking upward redundant rules, the data structure utilized is herein referenced as a partial PDD. A partial PDD is a diagram that may not have the completeness property of a standard PDD, but has all the other properties of a standard PDD.

$S_f$ denotes the set of all the rules defined by all the decision paths in a partial PDD f. For any packet p that $p \in \cup_{r \in S_f} M(r)$ there is one and only one rule in $S_f$ that p matches, and f(p) denotes the decision of the unique rule that p matches in f.

Given a partial PDD f and a sequence of rules $<r_1, r_2, \ldots, r_k>$ that may be not comprehensive, f is equivalent to $<r_1, r_2 \ldots, r_k>$ if and only if the following two conditions hold:

1. $\cup_{r \in S_f} M(r) = \bigcup_{i=1}^{k} M(r_i)$

2. For any packet p that $p \in \cup_{r \in S_f} M(r)$, f(p) is the same as the decision of the first rule that p matches in the sequence $<r_1, r_2 \ldots, r_k>$.

By definition, a rule is upward redundant if and only if its resolving set is empty. Therefore, in order to remove all upward redundant rules from a packet classifier, a resolving set for each rule in the packet classifier must be calculated. The resolving set of each rule is calculated by its effective rule set. An "effective rule set" of a rule r in a packet classifier f is a set of non-overlapping rules where the union of all the matching sets of these rules is exactly the resolving set of rule r in f. More precisely, an effective rule set of a rule r is defined as follows:

Definition 4: Let r be a rule in a packet classifier f. A set of rules $\{r'_1, r'_2 \ldots r'_k\}$ is an effective rule set of r if and only if the following three conditions hold:

1. $R(r, f) = \bigcup_{i=1}^{k} M(r'_i)$

2. $M(r'_i) \cap M(r'_j) = \emptyset$ for $1 \leq i < j \leq k$,
3. $r'_i$ and r have the same decision for $1 \leq i \leq k$ For example, consider packet classifier 160 depicted FIG. 1C. Then, $\{F_1 \in [1, 50] \rightarrow accept\}$ is an effective rule set of rule $r_1$, $\{F_1 \in [51, 90] \rightarrow discard\}$ is an effective rule set of rule $r_2$, $\emptyset$ is an effective rule set of rule $r_3$, and $\{F_1 \in [91, 100] \rightarrow discard\}$ is an effective rule set of rule $r_4$. Clearly, once an effective rule set of a rule r in a packet classifier f is obtained, the resolving set of the rule r in f is known, and consequently know whether the rule r is upward redundant in f. Note that by the definition of an effective rule set, if one effective rule set of a rule r is empty, then any effective rule set of the rule r is empty. Theorem 5, discussed herein in more detail, straightforwardly follows from the above discussion.

Theorem 5: A rule r is upward redundant in a packet classifier if and only if an effective rule set of r is empty.

Based on Theorem 5, the basic idea of the upward redundancy removal algorithm is as follows: given a packet classifier $<r_1, r_2, \ldots, r_n>$, an effective rule set for each rule from $r_1$ to $r_n$ is calculated. If the effective rule set calculated for a rule $r_i$ is empty, then $r_i$ is upward redundant and is removed.

Figure 4:
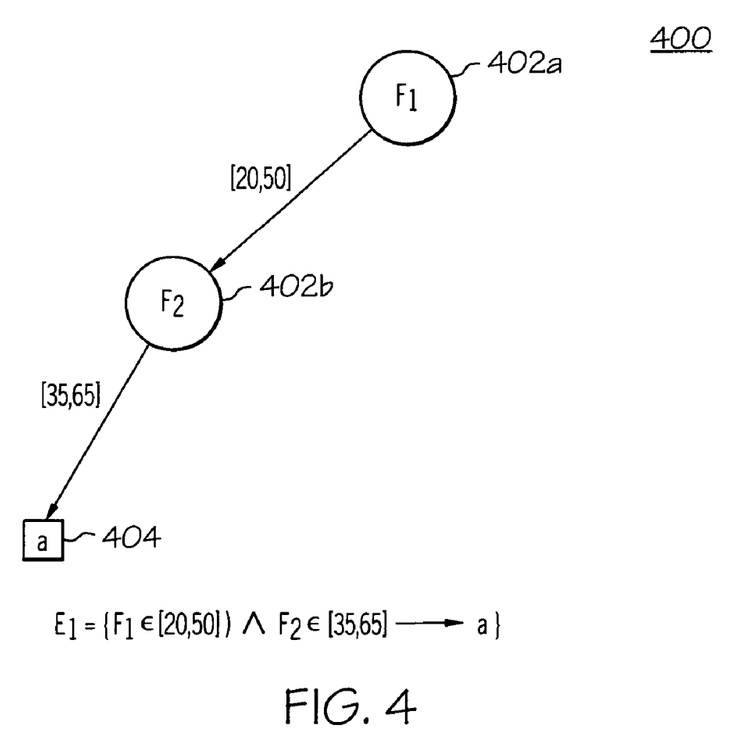
FIG. 4 depicts an exemplary first partial packet decision diagram according to a preferred embodiment of the present invention.
Figure 5:
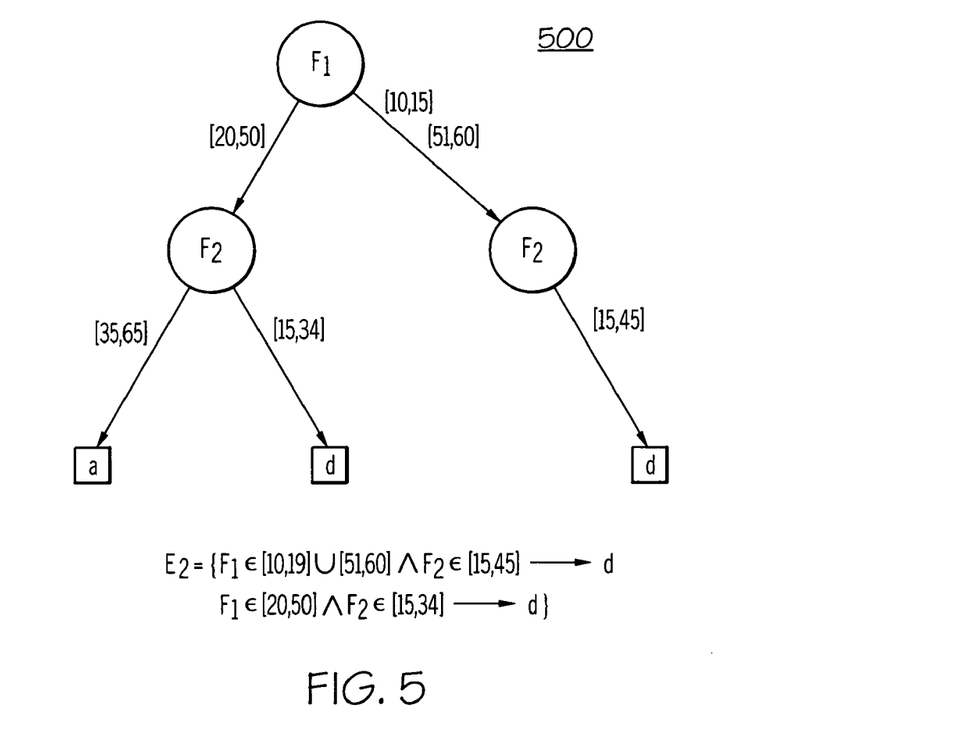
FIG. 5 illustrates an exemplary second partial packet decision diagram according to a preferred embodiment of the present invention.

An effective rule set for each rule in a packet classifier is calculated with the help of partial PDDs (e.g., partial PDD 400 and 500 in FIGS. 4 and 5). Consider a packet classifier that consists of n rules $<r_1, r_2 \ldots, r_n>$. The upward redundancy removal algorithm first builds a partial PDD, denoted $f_1$, that is equivalent to the sequence $<r_1>$, and calculates an effective rule set, denoted $E_1$, of rule $r_1$. (Note that $E_1$ cannot be empty because $M(r_1) \neq \emptyset$; therefore, $r_1$ cannot be upward redundant.) Then the algorithm transforms the partial PDD $f_1$ to another partial PDD, denoted $f_2$, that is equivalent to the sequence $<r_1, r_2>$, and during the transformation process calculates an effective rule set, denoted $E_2$, of rule $r_2$. The same transformation process continues until we reach $r_n$. When we finish, an effective rule set is calculated for each rule.

$f_i$ is utilized to denote the partial PDD that constructed from the rule sequence $<r_1, r_2 \ldots, r_i>$, and $E_i$ to denote the effective rule set that is calculated for rule $r_i$. By the following example, the process of transforming the partial PDD $f_i$ to the partial PDD $f_{i+1}$, and the calculation of $E_{i+1}$ is illustrated. Consider the packet classifier in FIG. 3 with the decision set $\{a, d\}$ and over fields $F_1$ and $F_2$, where $D(F_1)=D(F_2)=[1, 100]$.

FIG. 4 illustrates a partial PDD $f_1$ 400 that is equivalent to $<r_1>$ and an effective rule set $E_1$ of rule $r_1$. In FIG. 4, $v_1$ denotes the node with label $F_1$, $e_1$ denotes the edge with label [20, 50], and $v_2$ denotes the node with label $F_2$.

To append rule $r_2$ to $f_1$ in order to get a partial PDD $f_2$ 500 (as illustrated in FIG. 5) that is equivalent to $<r_1, r_2>$, and to calculate an effective rule set $E_2$ of rule $r_2$, a comparison of the set [10, 60] with the set [20, 50] labeled on the outgoing edge of $v_1$ is made. Since $[10, 60]-[20, 50]=[10, 19] \cup [51, 60]$, $r_2$ is the first matching rule for all packets that satisfy $F_1 \in [10, 19] \cup [51, 60] \wedge F_2 \in [15, 45]$, one outgoing edge e to $v_1$ is added, where e is labeled $[10, 19] \cup [51, 60]$ and e points to the path built from $F_2 \in [15, 45] \rightarrow d$. The rule defined by the decision path containing e, $F_1 \in [10, 19] \cup [51, 60] \wedge F_2 \in [15, 45] \rightarrow d$, should be put in $E_2$ because for all packets that match this rule, $r_2$ is their first matching rule. Because $[20, 50] \subset [10, 60]$, $r_2$ is possibly the first matching rule for a packet that satisfies $F_1 \in [20, 50]$. A comparison of the set [35, 65] labeled on the outgoing edge of $v_2$ with the set [15, 45] is made. Since $[15, 45]-[35, 65]=[15, 34]$, a new edge e' to $v_2$ is added, where e' is labeled [15, 34] and e' points to a terminal node labeled d. The rule, $F_1 \in [20, 50] \wedge F_2 \in [15, 34] \rightarrow d$, defined by the decision path containing the new edge $e'_1$, is added into $E_2$. The partial PDD $f_2$ 500 (FIG. 5) and an effective rule set $E_2$ of rule $r_2$ is shown in FIG. 5, where $E_2$ consists of the two rules defined by the two new paths that contain new edges e and e' that added to the partial PDD $f_1$ 400 depicted in FIG. 4.

Let f be any packet classifier that consists of n rules: $<r_1, r_2 \ldots, r_n>$. A partial PDD that is equivalent to $<r_1>$ is easy to construct. Assuming $r_1$ is $(F_1 \in S_1) \wedge (F_2 \in S_2) \wedge \ldots \wedge (F_d \in S_d) \rightarrow <decision>$. Then the partial PDD that consists of only one path $(v_1 e_1 v_2 e_2 \ldots v_d e_d v_{d+1})$, where $F(v_i)=F_i$ and $I(e_i)=S_i$ for $1 \leq i \leq d$ and $F(v_{d+1})=<decision>$, is equivalent to $<r_1>$. This partial PDD is denoted by $f_1$, and ($v_1 e_1 v_2 e_2 \ldots v_d e_d v_{d+1}$) is hereinafter referred to as "the path that is built from rule $(F_1 \in S_1) \wedge (F_2 \in S_2) \wedge \ldots \wedge (F_d \in S_d) \rightarrow$ <decision>".

Suppose that a partial PDD $f_i$ that is equivalent to the sequence <$r_1, r_2 \ldots, r_i$> is constructed and an effective rule set for each of these i rules is calculated. Let v be the root of $f_i$, and assume v has k outgoing edges $e_1, e_2 \ldots, e_k$. Let rule $r_{i+1}$ be $(F_1 \in S_1) \wedge (F_2 \in S_2) \wedge \ldots \wedge (F_d \in S_d) \rightarrow$<decision>. Next, the partial PDD $f_i$ is transformed to a partial PDD, denoted $f_{i+1}$, that is equivalent to the sequence $(r_1, r_2, \ldots, r_i)$, and during the transformation process, an effective rule set denoted $E_{i+1}$, for rule $r_{i+1}$ is calculated.

First, a determination is made as to whether the addition of another outgoing edge to v is required. If $S_1 - (I(e_1) \cup I(e_2) \cup \ldots \cup I(e_k)) \neq \emptyset$, a new outgoing edge $e_{k+1}$ with label $S_1 - (I(e_1) \cup I(e_2) \cup \ldots \cup I(e_k))$ to v is needed. This is because any packet, whose $F_1$ field satisfies $S_1 - (I(e_1) \cup I(e_2) \cup \ldots \cup I(e_k))$, does not match any of the first i rules, but matches $r_{i+1}$ provided that the packet also satisfies $(F_2 \in S_2) \wedge (F_3 \in S_3) \wedge \ldots \wedge (F_d \in S_d)$. The new edge $e_{k+1}$ points to the root of the path that is built from $(F_2 \in S_2) \wedge (F_3 \in S_3) \wedge \ldots \wedge (F_d \in S_d) \rightarrow$ <decision>. The rule r, $(F_1 \in S_1 - (I(e_1) \cup I(e_2) \cup \ldots \cup I(e_k))) \wedge (F_2 \in S_2) \wedge \ldots \wedge (F_d \in S_d) \rightarrow$<decision>, defined by the decision path containing the new edge $e_{k+1}$ has the property $M(r) \subseteq (r_{i+1}, f)$. Therefore, we add rule r to $E_i$.

Next, comparison of $S_1$ and $I(e_j)$ for each j ($1 \leq j \leq k$) is made in the following three cases:

1. $S_1 \cap I(e_j) = \emptyset$: edge $e_j$ is skipped because any packet whose value of field $F_1$ is in set $I(e_j)$ doesn't match $r_{i+1}$.
2. $S_1 \cap I(e_j) = I(e_j)$: For a packet p whose value of field $F_1$ is in set $I(e_j)$, the first rule that p matches may be one of the first i rules, and may be rule $r_{i+1}$. So $(F_2 \in S_2) \wedge (F_3 \in S_3) \wedge \ldots \wedge (F_d \in S_d) \rightarrow$<decision> is appended to the sub-graph rooted at the node that $e_j$ points to in a similar fashion.
3. $S_1 \cap I(e_j) \neq \emptyset$ and $S_1 \cap I(e_j) \neq I(e_j)$: edge e is split into two edges: e' with label $I(e_j) - S_1$ and e'' with label $I(e_j) \cap S_1$. Then two copies of the subgraph rooted at the node that $e_j$ points to is made, and let e' and e'' point to one copy each. Thus, e' is handled by the first case, and e'' is handled by the second case.

In the process of appending rule $r_{i+1}$ to partial PDD $f_i$, each time a new edge is added to a node in $f_i$, the rule defined by the decision path containing the new edge is added to $E_{i+1}$. After the partial PDD $f_i$ is transformed to $f_{i+1}$, the rules in $E_{i+1}$ satisfy the following three conditions: (1) the union of all the matching sets of these rules is the resolving set of $r_{i+1}$ according to the transformation process, (2) no overlapping among these rules by the consistency properties of a partial PDD, (3) all these rules have the same decision as $r_{i+1}$ according to the transformation process. Therefore, $E_{i+1}$ is an effective rule set of rule $r_{i+1}$.

Figure 3:
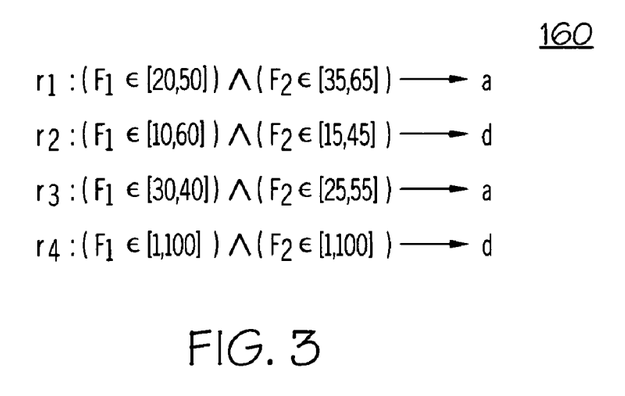
FIG. 3 illustrates an exemplary packet classifier according to a preferred embodiment of the present invention.
Figure 6:
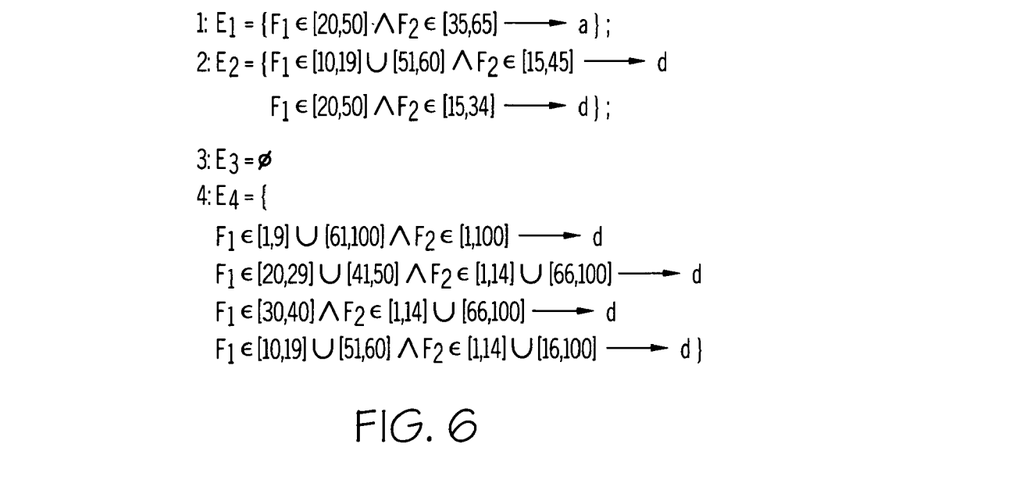
FIG. 6 illustrates exemplary effective rule sets calculated for packet classifier rules depicted in FIG. 3.

By applying the upward redundancy removal algorithm according to a preferred embodiment of the present invention to packet classifier 300 in FIG. 3, an effective rule set for each rule is obtained, as depicted in FIG. 6. Note that $E_3 = \emptyset$, which indicates that rule $r_3$ is upward redundant, and $r_3$ is therefore removed. An exemplary method of removing upward redundant rules is as follows:

---

Upward Redundancy Removal Algorithm

--- input : A packet classifier f that consists of n rules < $r_1, r_2 \ldots, r_n$ >
output : (1) Upward redundant rules in f are removed.
         (2) An effective rules set for each rule is calculated.
1. Build a path from rule $r_1$ and let v be the root;
   $E_1 := \{r_1\}$;
2. for i := 2 to n do
   (1) $E_1 := \emptyset$;
   (2) Ecal(v, I, $r_i$ );
   (3) if $E_i = \emptyset$ then remove $r_i$;
Ecal (v, i, $(F_j \in S_j) \wedge \ldots \wedge (F_d \in S_d) \rightarrow$ <decision>)/* F (v) = $F_j$ and E (v) = $\{e_1, \ldots, e_k\}$ */
1. if $S_j - (I(e_1) \cup \ldots \cup I(e_k)) \neq \emptyset$ then
   (1) Add an outgoing edge $e_{k+1}$ with label $S_j - (I(e_1) \cup \ldots \cup I(e_k))$ to v;
   (2) Build a path from $(F_{j+1} \in S_{j+1}) \wedge \ldots \wedge (F_d \in S_d) \rightarrow$ <decision>, and let $e_{k+1}$ point to its root;
   (3) Add the rule defined by the decision path containing edge $e_{k+1}$ to $E_i$;
2. if j < d then
   for g := 1 to k do
     if $I(e_g) \subseteq S_j$ then
       Ecal ($e_g$.t, i, $(F_{j+1} \in S_{j+1}) \wedge \ldots \wedge (F_d \in S_d) \rightarrow$ <decision>);
     else if $I(e_g) \cap S_j \neq \emptyset$ then
       (1) $I(e_g) := I(e_g) - S_j$ ;
       (2) Add one outgoing edge e with label $I(e_g) \cap S_j$ to v;
       (3) Replicate the graph rooted at $e_g$.t, and let e points to the replicated graph;
       (4) Ecal (e.t, i, $(F_{j+1} \in S_{j+1}) \wedge \ldots \wedge (F_d \in S_d) \rightarrow$ <decision>);

---

One particular advantage of detecting and removing upward redundant rules before detecting and removing downward redundant rules in a packet classifier is that an effective rule set for each rule is calculated by the upward redundancy removal algorithm. Therefore, the effective rule set of each rule can be utilized to determine whether the rule is downward redundant. The effective rule set $E_i$ calculated for rule $r_i$ in a packet classifier f is important in checking whether $r_i$ is downward redundant because the resolving set of $r_i$ in f can be easily obtained by the union of the matching set of every rule in $E_i$.

A preferred method for removing downward redundant rules of the present invention is based the following theorem.

Theorem 6: Let f be any packet classifier that consists of n rules: <$r_1, r_2 \ldots, r_n$>. Let $f_i$ ($2 \leq i \leq n$) be a standard PDD that is equivalent to the sequence of rules <$r_i, r_{i+1} \ldots, r_n$>. The rule $r_{i-1}$ with an effective rule set $E_{i-1}$ is downward redundant in f if and only if for each rule r in $E_{i-1}$ and for each decision path ($v_1 e_1 v_2 e_2 \ldots v_d e_d v_{d+1}$) in $f_i$ where rule r overlaps the rule that is defined by this decision path, the decision of r is the same as the label of the terminal node $v_{d+1}$.

Proof Sketch: Since the sequence of rules $<r_i, r_{i+1} \ldots, r_n>$ is comprehensive, there exists a standard PDD that is equivalent to this sequence of rules. By the redundancy theorem, rule $r_{i-1}$ is downward redundant iff for each rule r in $E_{i-1}$ and for any p that $p \in M(r)$, $<r_i, r_{i+1} \ldots, r_n>$(p) is the same as the decision of r. Therefore, Theorem 6 follows.

A standard PDD $f_i$, ($2 \leq i \leq n$), that is equivalent to the sequence of rules $<r_i, r_{i+1} \ldots, r_n>$ can be constructed. The standard PDD $f_n$ can be built from rule $r_n$ in the same way that we build a path from a rule in the upward redundancy removal algorithm.

Assume a standard PDD $f_i$ that is equivalent to the sequence of rules $<r_i, r_{i+1} \ldots, r_n>$ has been constructed. Whether rule $r_{i-1}$ is downward redundant is checked utilizing Theorem 6. If rule $r_{i-1}$ is downward redundant, then $r_i$ is removed, the standard PDD $f_i$ is renamed to be $f_{i-1}$, and a check to whether $r_{i-2}$ is downward redundant is continued. If rule $r_{i-1}$ is not downward redundant, then rule $r_{i-1}$ is appended to the standard PDD $f_i$ such that the resulting diagram is a standard PDD, denoted $f_{i-1}$, that is equivalent to the sequence of rules $<r_{i-1}, r_i \ldots, r_n>$. This procedure of transforming a standard PDD by appending a rule is similar to the procedure of transforming a partial PDD in the upward redundancy removal algorithm. The above process continues until $r_1$ is reached. Therefore, all downward rules are removed. A preferred method for detecting and removing downward redundant rules according a preferred embodiment of the present invention is as follows:

---

Downward Redundancy Removal Algorithm input : A packet classifier $<r_1, r_2, \ldots, r_n>$ where each rule $r_i$ has an effective rule set $E_i$.
output : Downward redundant rules in f are removed.
1. Build a path from rule $r_n$ and let v be the root;
2. for i:= n −1 to 1 do
    if IsDownwardRedundant (v, $E_i$) = true
    then remove $r_i$;
    else Append (v, $r_i$);
IsDownwardRedundant (v, E)/* E = $\{r_1', \ldots, r_m'\}$ */
1. for j:=1 to m do
    if HaveSameDecision (v, $r_j'$) = false then return (false);
2. return (true) ;
HaveSameDecision (v, $(F_i \in S_i) \wedge \ldots \wedge (F_d \in S_d) \to$ <decision>)/* F(v) = $F_i$ and E(v) = $\{e_1, \ldots, e_k\}$ */
1. for j :=1 to k do
    if $I(e_j) \cap S_i \neq \emptyset$ then
        if i < d then
            if HaveSameDecision ($e_j.t, (F_{i+1} \in S_{i+1}) \wedge \ldots \wedge (F_d \in S_d) \to$ <decision>)=
            false
            then return (false);
        else
            if $F(e_j.t) \neq$ <decision>then return (false) ;
2. return (true) ;
Append (v, $(F_i \in S_i) \wedge \ldots \wedge (F_d \in S_d) \to$ <decision>)/* F(v) = $F_i$ and E(v) = $\{e_1, \ldots, e_k\}$ */
if i < d then
    for j := 1 to k do
        if $I(e_j) \subseteq S_i$ then
            Append ($e_j.t, (F_i \in S_i) \wedge \ldots \wedge (F_d \in S_d) \to$ <decision>);
        else if $I(e_j) \cap S_i \neq \emptyset$ then
            (1) $I(e_j) := I(e_j) - S_i$;
            (2) Add one outgoing edge e with label $I(e_j) \cap S_i$ to v;
            (3) Replicate the graph rooted at $e_j.t$, and let e points to the replicated
            graph;
            (4) Append (e.t, $(F_{i+1} \in S_{i+1}) \wedge \ldots \wedge (F_d \in S_d) \to$ <decision>);
else /*i = d*/
    (1) for j:=1 to k do
        (a) $I(e_j) := I(e_j) - S_i$;
        (b) if $I(e_j) = \emptyset$ then remove edge $e_j$ and node $e_j.t$;
    (2) Add one outgoing edge e with label $S_i$ to v, create a terminal node with label
        <decision>, and let e point this terminal node;

Applying the downward redundancy removal algorithm to the packet classifier 300 in FIG. 3 with the assumption that $r_3$ has been removed, rule $r_2$ is detected to be downward redundant and is therefore removed. The standard PDD depicted in FIG. 2 is the resulting standard PDD by appending rule $r_1$ to the standard PDD that is equivalent to $<r_4>$.

Figure 7A:
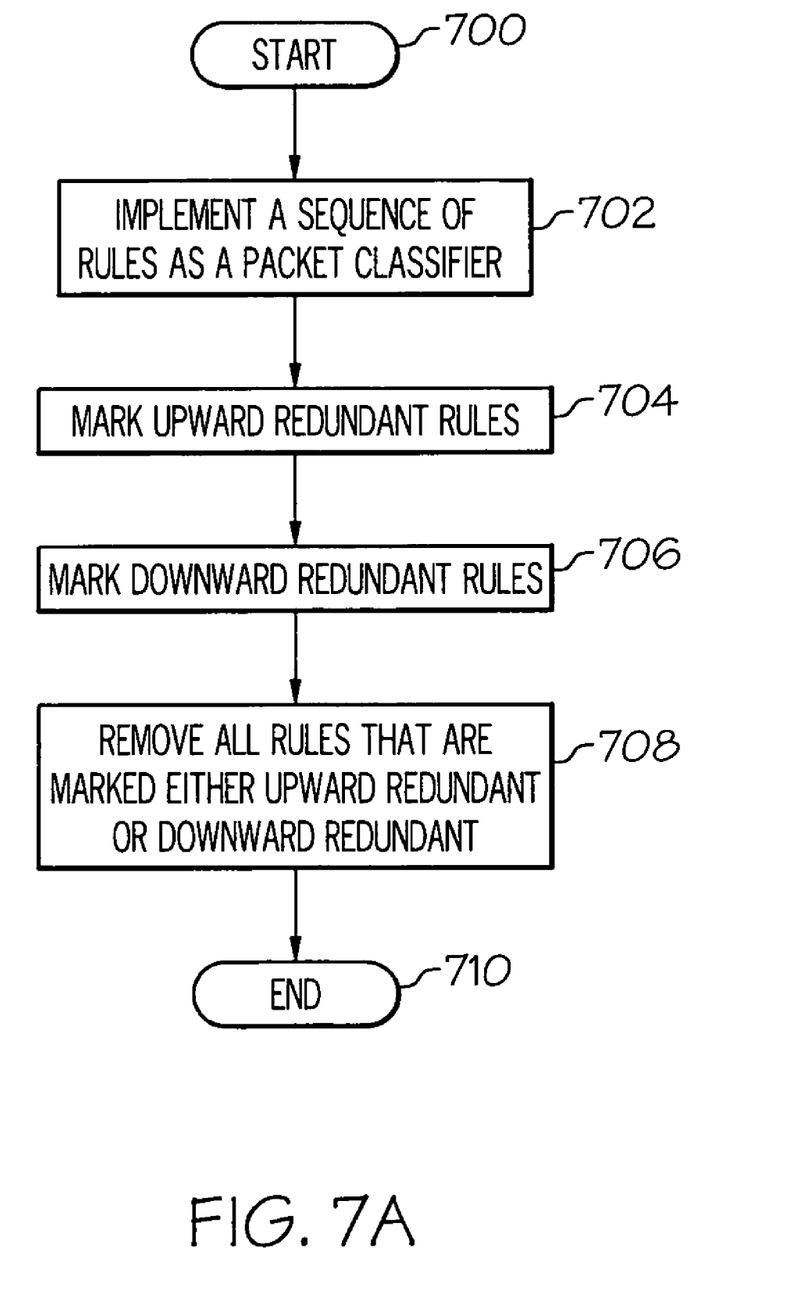
FIG. 7A-7C depicts an exemplary method for removing redundancy in packet classifiers according to a preferred embodiment of the present invention.

FIG. 7A is a high-level logical flowchart diagram illustrating an exemplary method of removing redundant rules from a packet classifier according to a preferred embodiment of the present invention. In an exemplary embodiment, the illustrated process is performed by redundancy manager 162. The process begins at step 700 and proceeds to step 702, which illustrates implementing a sequence of rules as a packet classifier 160. As previously discussed, packet classifier 160 may be implemented by any type of design method. The process continues to steps 704 and 706, which depict redundancy manager 162 marking any upward and downward redundant rules found in packet classifier 160. The exemplary processes utilized to mark upward and downward redundant rules are discussed in more detail in conjunction with FIGS. 7B-7C. The process continues to step 708, which depicts redundancy manager 162 removing all rules that are marked as either upward redundant or downward redundant. The process ends in step 710.

Figure 7B:
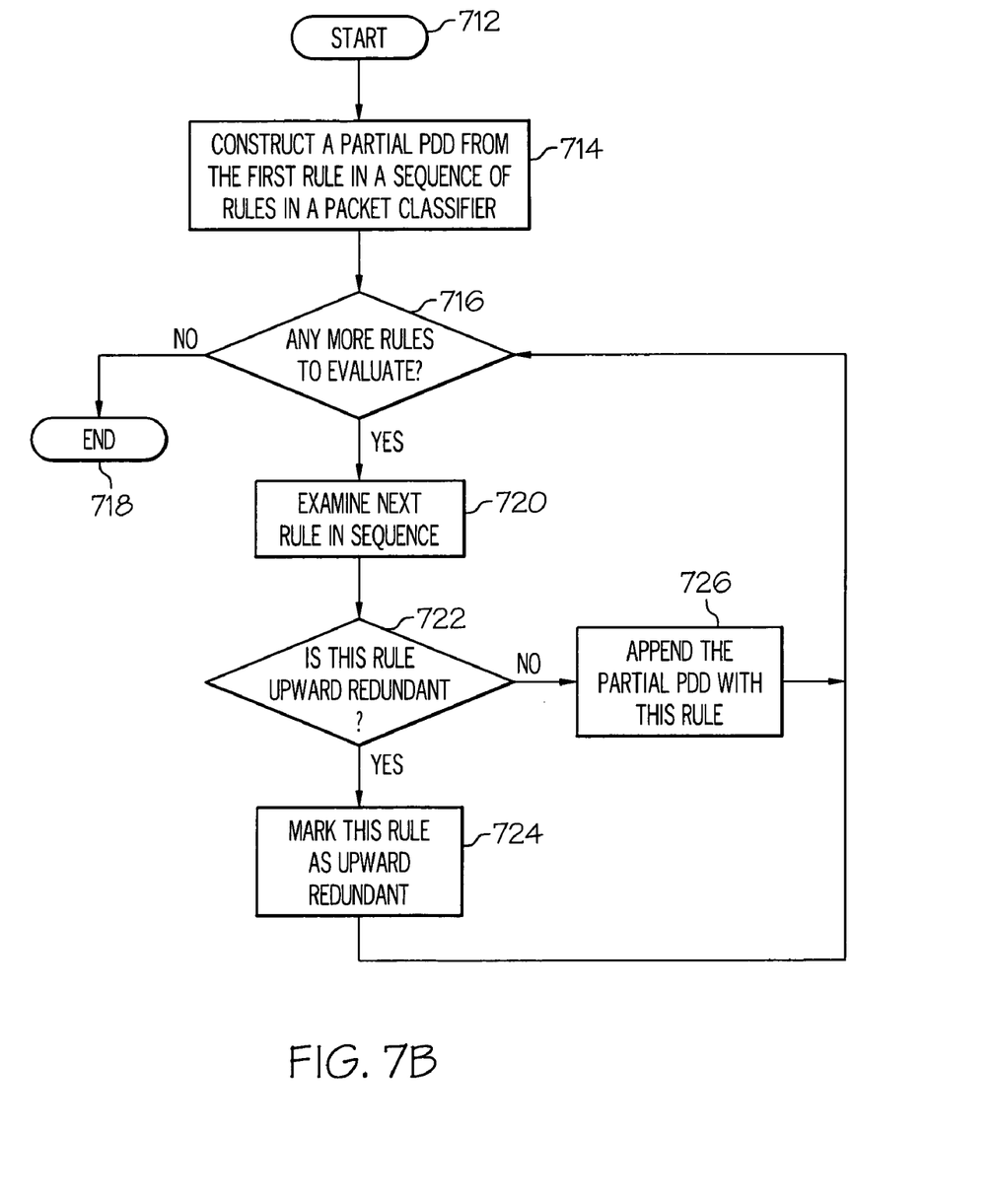

FIG. 7B is a high-level logical flowchart diagram depicting an exemplary method for identifying and marking upward redundant rules in accordance with a preferred embodiment of the present invention. The process begins at step 712 and continues to step 714, which illustrates redundancy manager 162 constructing a partial packet decision diagram (PDD) from a first rule in a sequence of rules in packet classifier 160. The process continues to step 716, which depicts redundancy manager 162 determining if there are any more rules to process in packet classifier 160. If there are no more rules to process, the process ends, as illustrated in step 718.

Returning to step 716, if there are more rules to process in packet classifier 160, the process proceeds to step 720, which depicts redundancy manger 162 examining a next rule in the sequence in packet classifier 160. Redundancy manager 162 then makes a determination of whether the presently-examined rule is upward redundant (step 722). If the rule is not upward redundant, redundancy manager 162 appends the partial packet decision diagram (PDD) with the presently examined rule. The process returns to step 716 and proceeds in an iterative fashion. If redundancy manager 162 determines that the rule is upward redundant, redundancy manager 162 marks the rule as upward redundant (step 724). The process returns to step 716 and proceeds in an iterative fashion.

Figure 7C:
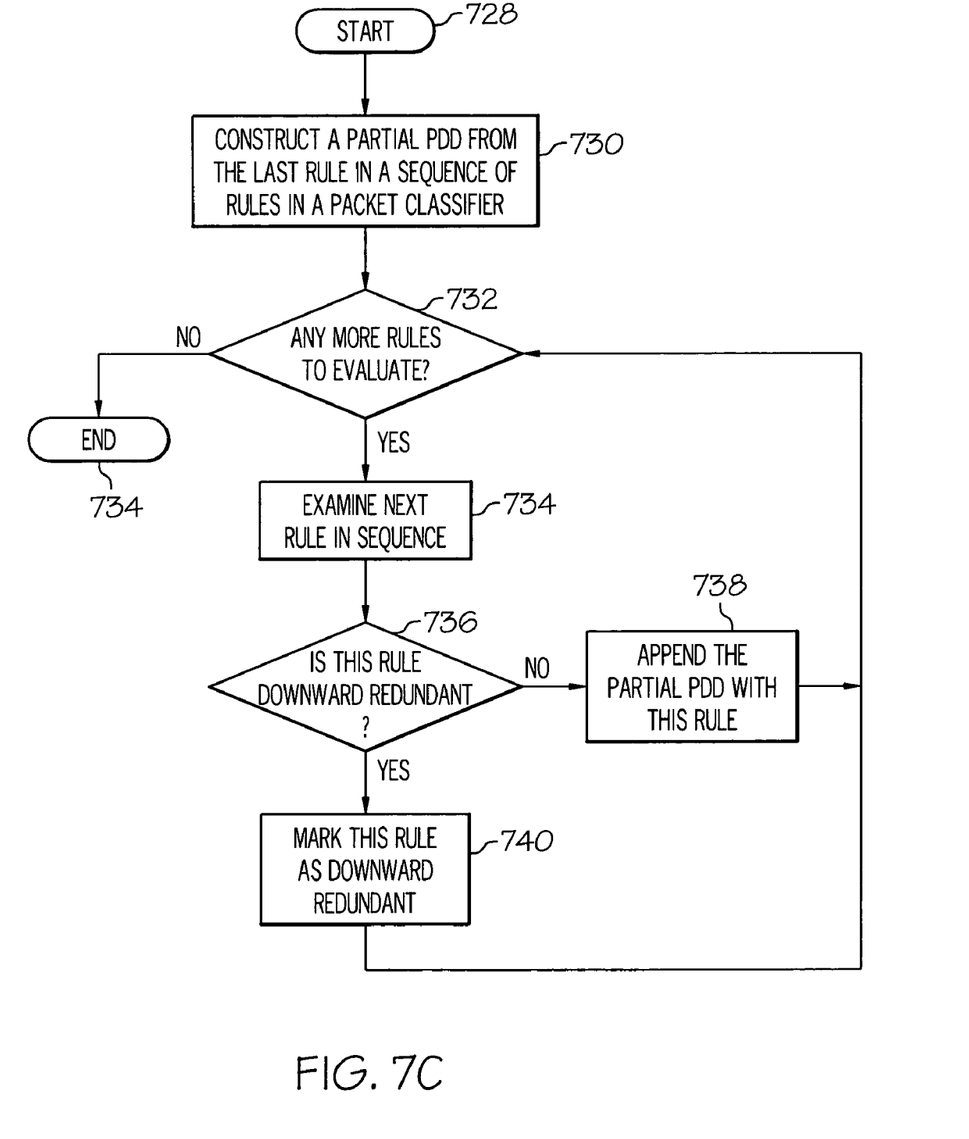

FIG. 7C is a high-level logical flowchart diagram depicting an exemplary method for identifying and marking downward redundant rules in accordance with a preferred embodiment of the present invention. The process begins at step 728 and continues to step 730, which illustrates redundancy manager 162 constructing a partial packet decision diagram (PDD) from a last rule in a sequence of rules in packet classifier 160. The process continues to step 732, which depicts redundancy manager 162 determining if there are any more rules to process in packet classifier 160. If there are no more rules to process, the process ends, as illustrated in step 734.

Returning to step 732, if there are more rules to process in packet classifier 160, the process proceeds to step 734, which depicts redundancy manger 162 examining a next rule in the sequence in packet classifier 160. Redundancy manager 162 then makes a determination of whether the presently-examined rule is downward redundant (step 736). If the rule is not downward redundant, redundancy manager 162 appends the partial packet decision diagram (PDD) with the presently examined rule. The process returns to step 716 and proceeds in an iterative fashion. If redundancy manager 162 determines that the rule is downward redundant, redundancy manager 162 marks the rule as downward redundant (step 724). The process returns to step 732 and proceeds in an iterative fashion.

As disclosed, the present invention includes a system, method, and computer-usable medium for removing redundancy from packet classifiers. In a preferred embodiment of the present invention, a packet classifier is implemented as a sequence of rules. A redundancy manager marks at least one upward redundant rule and at least one downward redundant rule. The redundancy manager removes at least one rule marked as upward redundant and at least one rule marked as downward redundant.

Those with skill in this art will appreciate that the present invention may be extended for use in many systems where a system can be represented by a sequence of rules. Examples of such systems are rule-based systems in the area of artificial intelligence and access control in the area of databases.

It should be understood that at least some aspects of the present invention may alternatively be implemented in a computer-usable medium that contains a program product. Program code defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer and telephone networks including Ethernet, the Internet, wireless networks, and like network systems. It should be understood, therefore, that such signal-bearing media when carrying or encoding stet program code that directs method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, mainframe computers, routers, switches, Personal Digital Assistants (PDAs), telephones, and any other system capable of processing, transmitting, receiving, capturing and/or storing data.

What is claimed is:

1. A method for identifying redundant rules, said method comprising:

receiving a sequence of rules from a network device;

generating an effective rule set for one of said rules by incorporating said one rule into an upward partial packet decision diagram (PDD);

determining whether or not said effective rule set is empty;

in a determination that said effective rule set is empty, classifying said one rule as an upward redundant rule among said sequence of rules;

determining whether or not every rule within another effective rule set of another one of said rules is consistent with a downward partial PDD;

in a determination that every rule within said another effective rule set of said another one rule is consistent with said downward partial PDD, classifying said another one rule as a downward redundant rule among said sequence of rules; and in a determination that not every rule within said another effective rule set of said another one rule is consistent with said downward partial PDD, incorporating said another one rule into said downward partial PDD.

2. The method of claim 1, wherein said classifying further includes eliminating said one rule from said sequence of rules.

3. The method according to of claim 2, wherein said eliminating further includes sending said sequence of rules to said network device after said rule elimination.

4. A network device capable of identifying redundant rules, said network device comprising:

a processor;

means for receiving a sequence of rules to be executed within said network device;

means for generating an effective rule set for one of said rules by incorporating said rule into an upward partial packet decision diagram (PDD);

means for determining whether or not said effective rule set is empty;

means for, in a determination that said effective rule set is empty, classifying said one rule as an upward redundant rule among said sequence of rules;

means for determining whether or not every rule within another effective rule set of another one of said rules is consistent with a downward partial PDD;

means for, in a determination that every rule within said another effective rule set of said another one rule is consistent with said downward partial PDD, classifying said another one rule as a downward redundant rule among said sequence of rules; and means for, in a determination that not every rule within said another effective rule set of said another one rule is consistent with said downward partial PDD, incorporating said another one rule into said downward partial PDD.

5. The network device of claim 4, wherein said said means for classifying further includes means for eliminating said one rule from said sequence of rules.

6. The network device of claim 5, wherein said network device further includes means for executing said sequence of rules.

7. A computer-usable non-transitory medium embodying a computer program product for identifying redundant rules, said computer-usable medium comprising:

computer program code for receiving a sequence of rules from a network device;

computer program code for generating an effective rule set for one of said rules by incorporating said one rule into an upward partial packet decision diagram (PDD);

computer program code for determining whether or not said effective rule set is empty;

computer program code for, in a determination that said effective rule set is empty, classifying said one rule as an upward redundant rule among said sequence of rules;

computer program code for determining whether or not every rule within another effective rule set of another one of said rules is consistent with a downward partial PDD;

computer program code for, in a determination that every rule within said another effective rule set of said another one rule is consistent with said downward partial PDD, classifying said another one rule as a downward redundant rule among said sequence of rules; and computer program code for, in a determination that not every rule within said another effective rule set of said another one rule is consistent with said downward partial PDD, incorporating said another one rule into said downward partial PDD.

8. The computer-usable medium of claim 7, wherein said computer program code for classifying further includes computer program code for eliminating said one rule from said sequence of rules.

9. The computer-usable medium of claim 8, wherein said computer program code for eliminating further includes computer program code for sending said sequence of rules to said network device after said rule elimination.

* * * * *